Patented Feb. 3, 1953

2,627,488

UNITED STATES PATENT OFFICE 2,627,488

PROCESS OF BLENDING BENZENE HEXACHLORIDE AND A CARRIER

Murray Zakheim, Philadelphia, Pa., assignor to The Pennsylvania Salt Manufacturing Company, Philadelphia, Pa., a corporation of Pennsylvania No Drawing. Application May 29, 1948, Serial No. 30,199

4 Claims. (Cl. 167—30)

This invention relates to insecticide compositions and method of manufacture and is particularly directed to making free flowing insecticide bases which can be used in either insecticide dust or spray compositions.

In the manufacture of insecticide compositions, where a normally solid insecticide is used, the insecticide is generally mixed with a finely divided solid diluent. The insecticide material and the diluent are then milled together to form a fine powder mix which powder is then used with other materials to form the final insecticide composition. It has been found that where the insecticide material is actually absorbed, as by being admixed when in a molten condition, in the solid diluent, rather than just being mechanically mixed therewith, the final insecticide composition is greatly improved.

Attempts have been made to prepare insecticide bases, to be used in the formulation of either insecticide dust or spray compositions, of a normally crystalline insecticide material such as benzene hexachloride and an inert diluent in which the insecticide material is absorbed in the individual particles of the diluent in substantial quantities. However, when attempting to make such insecticide bases, it was found that the individual particles of the benzene hexachloride and diluent base mix would, after standing any appreciable time, tend to stick together and cake. Also, when the resultant mixture of benzene hexachloride and diluent were milled in any conventional milling machine, such as a hammer or ball mill, considerable difficulty was encountered by the mixture of benzene hexachloride and diluent packing and caking badly during the milling operation.

The exact reason for this packing and caking of the powdered mix of benzene hexachloride and diluent on standing or on milling is not known. However, whatever may be the actual cause of this sticking or packing of the resultant benzene hexachloride and diluent base mix, the primary object of this invention is to eliminate or greatly reduce this tendency to cake and stick and to produce a substantially free flowing insecticide base material comprising a mixture of a solid diluent and benzene hexachloride absorbed therein which mix can easily be milled without packing or caking and which has little or no tendency to stick or cake on standing.

The tendency of the benzene hexachloride and solid diluent mix to pack and cake on standing or later milling may be due, in part, to the fact that benzene hexachloride as used in insecticide compositions is actually a mixture of isomers varying in physical properties and that certain physical changes occur gradually over a period of time after the molten benzene hexachloride has been added to and admixed with the diluent.

I have found that if, after the molten benzene hexachloride has been added to and thoroughly admixed with the comminuted solid diluent, the resultant mix is aged over a period of time, not less than one hour, the most advantageous length of time depending on its treatment during the aging period, and then milled to the desired particle size, little or no packing or caking during the milling operation is encountered and the resultant material is substantially free flowing and will not stick or cake to a serious extent on standing in storage for months. This aging period is not to be confused with the time necessary for the material to cool to room temperature, the aging period normally being substantially longer, the difference in cooling and aging time depending on the rapidity with which the material cools. Of course, if the cooling is abnormally slowed down so as to lengthen the cooling period to an unusual extent, it is conceivable that the cooling and aging period might almost coincide.

In a preferred method of carrying out my invention, the insecticide material is first heated to a molten condition. The molten insecticide is then slowly added to a solid diluent material while the diluent material is continuously stirred so as to obtain a thorough mixing. The resulting mixture of diluent and benzene hexachloride is then seasoned or aged prior to the final milling. The resultant mix is then milled and a free flowing powder obtained. By following this procedure the tendency of the individual particles in the mix to pack or stick together on prolonged standing may be substantially eliminated. Also by mixing the insecticide material and the diluent in this manner, a large proportion of the insecticide material is absorbed into the individual particles of the finely divided diluent.

The seasoning or aging step may be carried out either, by allowing the benzene hexachloride, after cooling, to stand and age without agitation for preferably not less than 5 hours, the preferred time being about 16 hours, or by leaving the benzene hexachloride and diluent in the mixer or blender after adding the molten benzene hexachloride and continuing to agitate the benzene hexachloride diluent mix during the aging process for not less than one hour, the preferred time, with vigorous agitation, being about two hours.

Various diluent materials can be used such as fuller's earth, diatomaceous earth and kaolin type clays. Some of the common trade products which have been found to give satisfactory results when used as diluents are "Attaclay" (an attapulgite of the fuller's earth type), the various "Celites" (diatomaceous earth products), "Dicalites" (also diatomaceous earth products) and "41 Clay" and "K Clay" (both of which are standard types of kaolin clays). The particular diluent used should be selected according to the absorptive properties desired and its inertness or its synergistic effect upon the insecticide with which it is used. The invention, however, is independent of the particular diluent material used since regardless of the solid diluent selected, as long as it has the necessary absorptive qualities the process as described can produce a free flowing non-packing mixture of the insecticide and diluent.

The following examples, which are not to be interpreted as limiting the invention but which are given by way of illustration only, show various methods of practicing my invention.

Example 1

About 35 parts of benzene hexachloride (containing the $\alpha$, $\beta$, $\gamma$, and $\delta$ isomers) were melted in a porcelain lined steam jacketed kettle. The molten material was then added to 65 parts of finely divided "Attaclay" (an attapulgite of the fuller's earth type) by spraying the molten benzene hexachloride thereon. The "Attaclay" was vigorously agitated in a ribbon blender while the benzene hexachloride was being added. After all of the benzene hexachloride had been added to the diluent and the mixture had been thoroughly agitated, the resulting mix was allowed to cool and age without further agitation for 24 hours. After this time the mix was passed through a final milling operation. The resulting mix of benzene hexachloride and diluent was found to be free flowing and to make an excellent base for either dust or spray insecticide compositions.

Example 2

About 1 part by weight of "Igepon AP Extra Concentrate" (a soduim sulfonate derivative of the oleic acid ester of an aliphatic compound having the structural formula $RCOOCH_2SO_3Na$ where R is $C_{12-18}$), 1 part by weight of carboxyl methyl cellulose and about 63 parts by weight of "Attaclay" were added to a ribbon blender, the clay being added first and followed, during agitation, by the "Igepon AP Extra Concentrate" and the carboxyl methyl cellulose. After blending for a few minutes about 35 parts of benzene hexachloride (containing $\alpha$, $\beta$, $\gamma$, and $\delta$ isomers) were added by spraying in from the top as the blender was running. Blending was contained for 15 to 20 minutes to allow equilibrium in the clay particles to become established. The charge was then dumped and the mixture allowed to cool and then age for about 24 hours after which the resultant mix was passed through a milling operation for micron-sizing following which it was packaged.

Example 3

63.3 parts of "Celite 209" (a diatomaceous earth) were added to a ribbon blender to which was then added 35 parts of a benzene hexachloride (containing $\alpha$, $\beta$, $\gamma$, and $\delta$ isomers). The benzene hexachloride was added by slowly pouring into the "Celite 209" while the same was being agitated. To this mixture was added 1 part "Arctic Syntex T" (a compound having the structural formula $C_{17}H_{33}CONHC_2H_4SO_3Na$) and .7 part of a low viscosity carboxy methyl cellulose. This mixture was blended for about an hour and a half after which time the resulting mix was fed to a mill and reduced to the desired particle size. No sticking or caking was noted during the milling operation and the final milled product was found to be substantially free from caking after a limited period of storage.

Procedures like those described in the preceding examples may be used to make directly usable dusts containing, for example, 1%, 5% or 10% of active ingredient, or more concentrated dust bases containing, for example, from 35% to over 50% benzene hexachloride. That is, I have found that the procedure of my invention is applicable, notwithstanding that varying proportions of diluent and benzene hexachloride are used, as is well known in the insecticide art. Also various methods of agitating the diluent while the benzene hexachloride is added may be used with satisfactory results. The invention, therefore, is not to be limited by the specific proportions of ingredients and method of compounding set forth in the specific examples given but should only be limited by the appended claims.

I claim:

1. A method of making insecticide dust and spray bases containing benzene hexachloride as an active insecticide ingredient comprising uniformly mixing the molten benzene hexachloride with a finely divided porous absorbent solid insecticide carrier, cooling and aging with agitation for at least one hour and then milling said aged mix of benzene hexachloride and carrier.

2. A method of making insecticide dust and spray bases containing benzene hexachloride as an active insecticide ingredient comprising uniformly mixing the molten benzene hexachloride with a finely divided porous absorbent solid insecticide carrier, cooling and aging with agitation for at least two hours and then milling said aged mix of benzene hexachloride and carrier.

3. A method of making insecticide dust and spray bases containing benzene hexachloride as an active insecticide ingredient comprising uniformly mixing the molten benzene hexachloride with a finely divided porous absorbent solid insecticide carrier, cooling and aging for at least five hours and then milling said aged mix of benzene hexachloride and carrier.

4. A method of making insecticide dust and spray bases containing benzene hexachloride as an active insecticide ingredient comprising uniformly mixing the molten benzene hexachloride with a finely divided porous absorbent solid insecticide carrier, cooling and aging for at least sixteen hours and then milling said aged mix of benzene hexachloride and carrier.

MURRAY ZAKHEIM.

(References on following page)

REFERENCES CITED

The following references are of record in the file of this patent:

UNITED STATES PATENTS

| Number | Name | Date |
|---|---|---|
| 1,550,650 | Banks | Aug. 18, 1925 |
| 2,423,457 | Lynn et al. | July 8, 1947 |
| 2,444,752 | Siegler | July 6, 1948 |
| 2,506,635 | Flenner | May 9, 1950 |
| 2,506,636 | Flenner | May 9, 1950 |

FOREIGN PATENTS

| Number | Country | Date |
|---|---|---|
| 573,689 | Great Britain | Dec. 3, 1945 |

OTHER REFERENCES

Annand: Committee on Medical Research of the Office of Scientific Research and Development, Nat. Res. Council Insect Control Comm. Rep. No. 167, Final Report, May 1944 to October 31, 1945, pages 5, 6, entitled "Invest. on the Control Of Insects and Other Arthropods of Importance to the Armed Forces."